United States Patent
Yamagata

(10) Patent No.: US 9,124,456 B2
(45) Date of Patent: Sep. 1, 2015

(54) EFFICIENT TRACKING OF DECISION-FEEDBACK EQUALISER COEFFICIENTS

(71) Applicant: Imagination Technologies Limited, Kings Langley (GB)

(72) Inventor: Taku Yamagata, Chepstow (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 14/178,180

(22) Filed: Feb. 11, 2014

(65) Prior Publication Data

US 2014/0294059 A1    Oct. 2, 2014

(30) Foreign Application Priority Data

Mar. 27, 2013 (GB) .................................. 1305593.4

(51) Int. Cl.
  *H03H 7/30* (2006.01)
  *H03H 7/40* (2006.01)
  *H03K 5/159* (2006.01)
  *H04L 25/03* (2006.01)

(52) U.S. Cl.
  CPC ................................. *H04L 25/03057* (2013.01)

(58) Field of Classification Search
  CPC ............................ H04L 25/4902; H04B 1/12
  USPC ...................................................... 375/233
  See application file for complete search history.

(56) References Cited

U.S. PATENT DOCUMENTS

| | | | |
|---|---|---|---|
| 6,782,043 B1 * | 8/2004 | Dehghan et al. | 375/224 |
| 2003/0026333 A1 * | 2/2003 | Murray et al. | 375/229 |
| 2003/0185295 A1 * | 10/2003 | Yousef | 375/233 |
| 2006/0227859 A1 | 10/2006 | Wei et al. | |
| 2007/0258517 A1 * | 11/2007 | Rollings et al. | 375/233 |
| 2008/0063041 A1 * | 3/2008 | Galperin et al. | 375/233 |
| 2008/0232453 A1 * | 9/2008 | Cohen et al. | 375/232 |
| 2008/0310493 A1 * | 12/2008 | Cohen et al. | 375/232 |
| 2010/0046599 A1 | 2/2010 | Kim et al. | |
| 2011/0002242 A9 * | 1/2011 | Perlow et al. | 370/278 |
| 2012/0236926 A1 | 9/2012 | Bourdoux et al. | |

OTHER PUBLICATIONS

Combined SER in GB1305593.4 Sep. 26, 2013.

* cited by examiner

*Primary Examiner* — Erin File
(74) *Attorney, Agent, or Firm* — Vory, Sater, Seymour and Pease LLP; Vincent M DeLuca

(57) ABSTRACT

Efficient methods and apparatus for tracking decision-feedback equaliser (DFE) coefficients are described. In an embodiment, updated coefficients for a feed-forward equaliser (FFE) are generated using conventional methods and then these are used, along with an averaged updated value of channel impulse response (CIR) estimate to generate updated DFE coefficients. In an embodiment, the updated DFE coefficients are generated by multiplying the updated CIR estimate (in the frequency domain) and the updated FFE coefficients (also in the frequency domain). The resultant updated DFE coefficients in the frequency domain may then be converted into the time domain before outputting to the DFE.

15 Claims, 8 Drawing Sheets

EFFICIENT TRACKING OF DECISION-FEEDBACK EQUALISER COEFFICIENTS

BACKGROUND

Digital terrestrial television signals suffer from multi-path interference which leads to pre-echoes which are caused by signals received via paths which are shorter than the path travelled by the principal signal and post-echoes which are caused by signals that have travelled along longer paths. A digital television receiver therefore comprises circuitry, including an adaptive equaliser, to suppress the echoes.

A common method of equalisation of such signals is to use a combination of a feed-forward equaliser (FFE) and a decision-feedback equaliser (DFE). These two different types of equaliser have different characteristics and can be used to deal with different aspects of the interference. The FFE can deal with both precursor and postcursor intersymbol interference (ISI), e.g. both pre-echoes and post-echoes, whilst the DFE can only deal with postcursor ISI but, unlike the FFE, does not enhance noise.

In order to use this combination of a FFE and DFE, initial equaliser coefficients are calculated; however, these initial coefficients are not likely to provide perfect equalisation results straight away and consequently the coefficients may be updated during operation of the equaliser. This updating of coefficients also enables the equaliser to adapt to possible channel changes. Typically the least-mean-square algorithm is used to update coefficients.

The embodiments described below are not limited to implementations which solve any or all of the disadvantages of known methods of updating equaliser coefficients.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Efficient methods and apparatus for tracking decision-feedback equaliser (DFE) coefficients are described. In an embodiment, updated coefficients for a feed-forward equaliser (FFE) are generated using conventional methods and then these are used, along with an averaged updated value of channel impulse response (CIR) estimate to generate updated DFE coefficients. In an embodiment, the updated DFE coefficients are generated by multiplying the updated CIR estimate (in the frequency domain) and the updated FFE coefficients (also in the frequency domain). The resultant updated DFE coefficients in the frequency domain may then be converted into the time domain before outputting to the DFE.

A first aspect provides a method of generating updated DFE coefficients for use in an equaliser in a wireless receiver, the equaliser comprising a FFE and a DFE and the method comprising: updating a channel impulse response estimate; updating FFE coefficients; and generating updated DFE coefficients based on the updated channel impulse response estimate and the updated FFE coefficients.

A second aspect provides an equaliser for use in a wireless receiver, the equaliser comprising a FFE, a DFE and a coefficient tracking module arranged to generate updated coefficients for the FFE and DFE and the hardware logic comprising: a CIR estimation module arranged to store and update an averaged estimate of CIR; a FFE coefficient update module arranged to generate updated FFE coefficients; and hardware logic arranged to generate updated DFE coefficients based on the updated CIR estimate and the updated FFE coefficients.

A third aspect provides a digital television receiver comprising an equaliser as described herein.

A fourth aspect provides a computer readable storage medium having encoded thereon computer readable program code for generating a processor comprising the equaliser described herein.

A fifth aspect provides a computer readable storage medium having encoded thereon computer readable program code for generating a processor configured to perform the method described herein.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Figure 1:
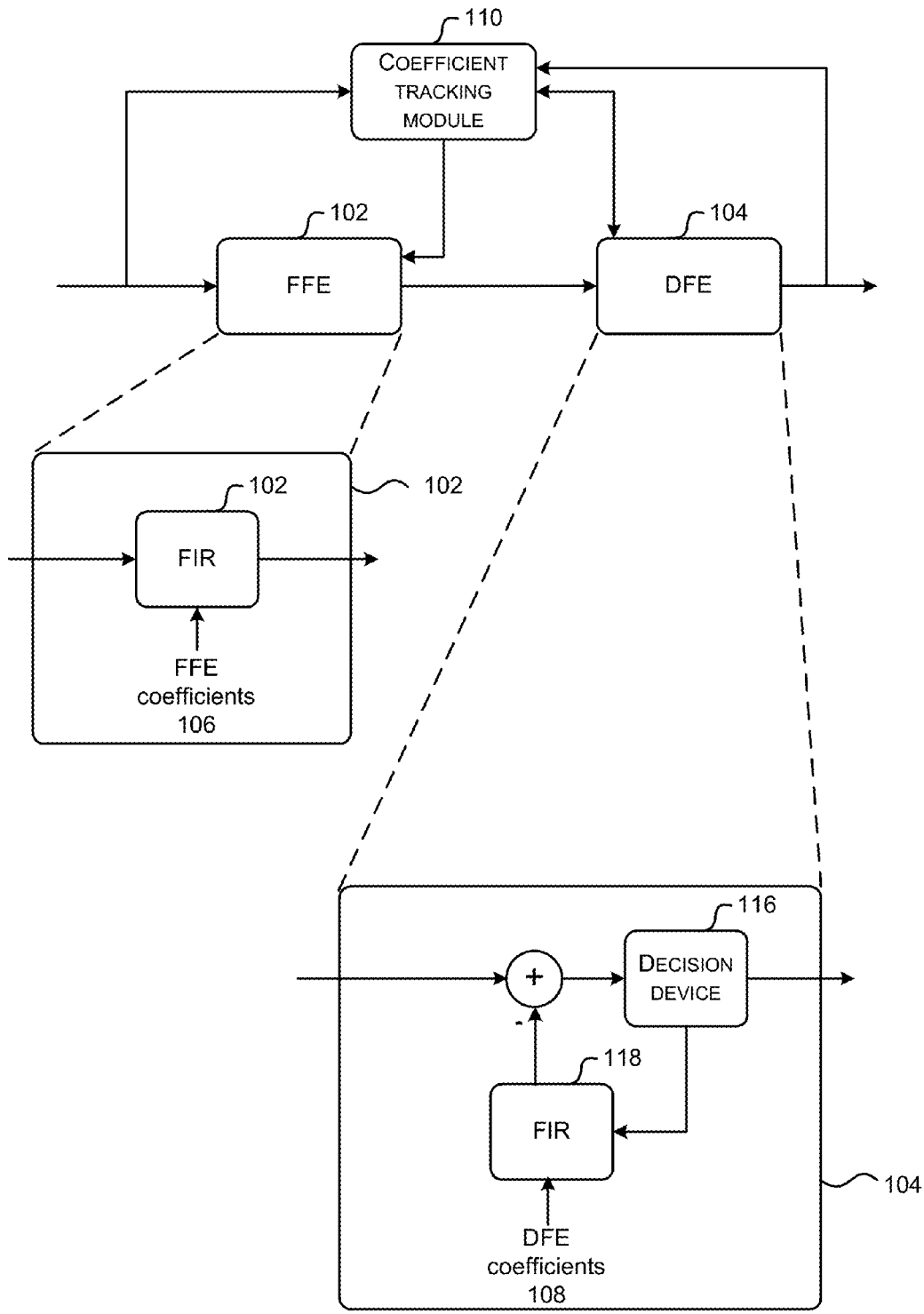
FIG. 1 shows a schematic diagram of the feedback structure in an example adaptive equaliser.

FIG. 1 shows a schematic diagram of the feedback structure in an example adaptive equaliser, such as may be used in a digital television receiver. As described above, a combination of a feed-forward equaliser (FFE) 102 and a decision-feedback equaliser (DFE) 104 may be used. These two different types of equaliser have different characteristics and can be used to deal with different aspects of the interference. In order to use this combination of a FFE and DFE, initial equaliser coefficients are calculated; however, these initial coefficients are not likely to provide perfect equalisation results straight away and consequently the coefficients 106, 108 may be updated during operation of the equaliser by the coefficient tracking module 110. This updating of coefficients, by the coefficient tracking module 110, also enables the equaliser to adapt to possible channel changes.

As shown in the expanded views in FIG. 1, the FFE may use the real part of the received data (as extracted in block 112) and this may be combined with the FFE coefficients (in the frequency domain). The DFE comprises a decision device 116, which may for example be a Trellis decoder, and then the DFE coefficients (in the time domain) are fed into FIR filters 118. In some examples, the decision device 116 may comprise a Trellis decoder and a remodulator which remodulates the data which is being fed back (to the FIR 118) to symbols.

As described above, the least-mean-square (LMS) algorithm is typically used to update both the FFE and DFE coefficients. The LMS algorithm incorporates an iterative procedure that makes successive corrections of the weight vector in the direction of the negative of the gradient vector, which eventually leads to the minimum mean square error. If the FFE and DFE are implemented in the time domain, the LMS algorithms for the update of the FFE and DFE coefficients are given by:

$$b_i[k+1] = b_i[k] - \mu e_D[k] x[k-i] \quad (1)$$

$$c_j[k+1] = c_j[k] + \mu e_D[k] \hat{y}[k-j] \quad (2)$$

where $b_i[k]$ ($i = 0, 1, \ldots, N_F$) are the FFE coefficients, $c_j[k]$ ($i = 0, 1, \ldots, N_B$) are the DFE coefficients, $\mu$ is the step size, $e_D[k]$ is the decision directed (DD) error, $x[k]$ is the equaliser input and $\hat{y}[k]$ is the output from the decision device.

It can be seen from equations (1) and (2) above that the error ($e_D[k]$) is required for incorporating LMS and this same error is used in updating both the FFE coefficients and the DFE coefficients. This process can be slow and does not take into consideration the interrelation between the FFE and DFE coefficients (i.e. the input to the DFE is the output from the FFE and so a change in the FFE coefficients will result in a change in the input to the DFE; however using the method shown in equations (1) and (2) the FFE and DFE coefficients are calculated in parallel based on the same error signal).

Figure 2:
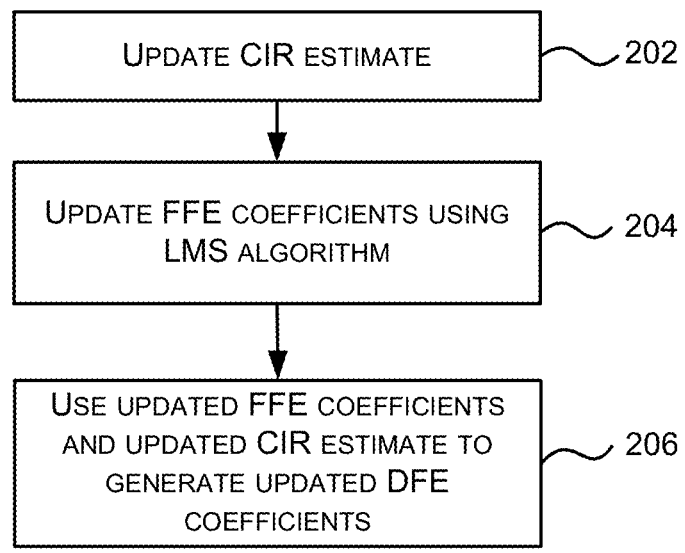
FIG. 2 shows a flow diagram of an example method of operation of a coefficient tracking module, such as shown in FIG. 1.

FIG. 2 shows a flow diagram of an example method of operation of the coefficient tracking module 110 which uses the LMS algorithm to calculate the updated FFE coefficients (e.g. using equation (1) above or its equivalent in the frequency domain) and then uses the updated FFE coefficients to calculate updated DFE coefficients. In this way, the interrelation between the FFE coefficients and the DFE coefficients is incorporated and it provides a method which allows the DFE coefficients to quickly adapt to changes in the channel and/or FFE variation, whilst requiring only a small amount of computation effort.

The coefficient tracking module 110 updates a stored CIR estimate (block 202) and updates the FFE coefficients using the LMS algorithm (block 204), e.g. as described above with reference to equation (1). The updated CIR estimate and the updated FFE coefficients are then used (in block 206) to generate updated DFE coefficients in the frequency domain as follows:

$$fDFE = fCIR * fFFE \quad (3)$$

where:
fDFE are the updated DFE coefficients in the frequency domain;
fCIR is the updated CIR estimate; and
fFFE are the updated FFE coefficients in the frequency domain (which may also be referred to as the frequency domain copy of the FFE coefficients).

The calculation of the updated DFE coefficients in the frequency domain (as in equation (3) above), therefore corresponds to a point to point multiplication process. This is equivalent to a convolution in the time domain but is much less complex to implement.

Although the DFE coefficients which are generated (in block 206) are described as updated DFE coefficients, it can be seen that the updated DFE coefficients are not generated based on the previous DFE coefficients (e.g. as is the case in equation (2) above) but instead are generated anew based on the updated FFE coefficients (in the frequency domain) and the updated CIR estimate.

Figure 3:
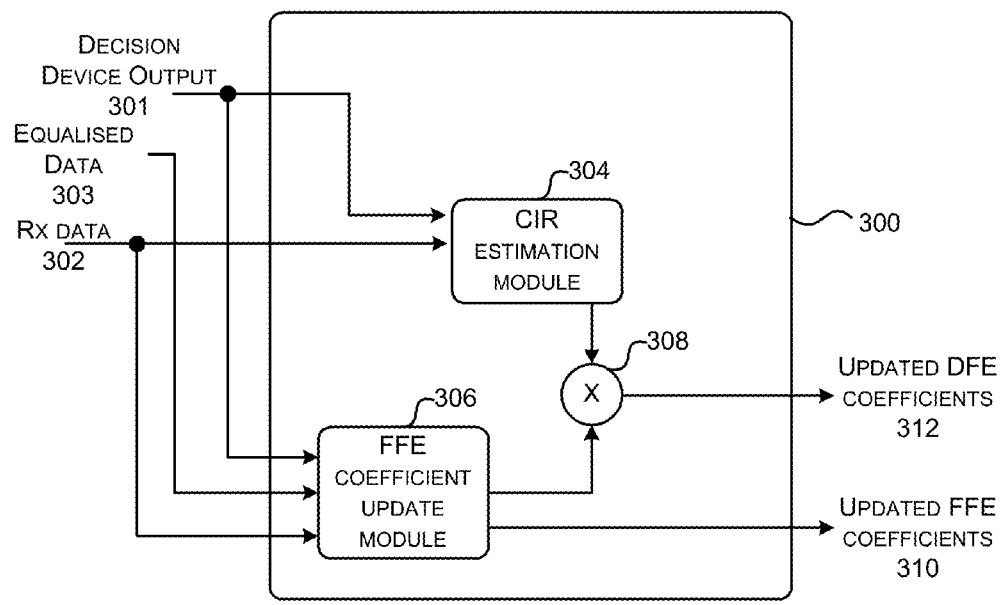
FIG. 3 shows a block diagram of an example implementation of a coefficient tracking module.

FIG. 3 shows a block diagram of an example implementation of the coefficient tracking module 110 in FIG. 1. The coefficient tracking module 300 shown in FIG. 3 receives, as inputs, the received data 302, the decision device output 301 (i.e. from decision device 116) and the equalised data 303. In some examples, the received data may have been processed in some way (e.g. converted into the frequency domain from the time domain using a Fast Fourier Transform (FFT)). The coefficient tracking module 300 comprises a CIR estimation module 304, a FFE coefficient update module 306 and other basic logic elements, such as a multiplier 308. As shown in FIG. 3, the CIR estimation module 304 generates an updated CIR estimate and this is multiplied (using multiplier 308) with the updated FFE coefficients generated by the FFE coefficient update module 306 using the LMS algorithm. The LMS algorithm used may be as given in equation (1) above or alternatively, the updating process may be modified according to the frequency domain implementation of the equalisation in the system in which the LMS algorithm is used. In an example, the LMS algorithm may have the form:

$$fFFE[k+1] = fFFE[k] - \mu \cdot fErr[k] \cdot conj(fData[k]) \quad (4)$$

where:
fFFE[k] is the frequency domain copy of the FFE coefficients at block k;
fErr[k] is the frequency domain copy of the error signal at block k;
fData[k] is the frequency domain copy of the input data to the equaliser or the received data 302 at block k; and
$\mu$ is the step size.

The updated FFE coefficients 310 and the updated DFE coefficients 312 are output by the coefficient tracking module 300 (e.g. to the FFE 102 and DFE 104 respectively in FIG. 1).

Figure 4:
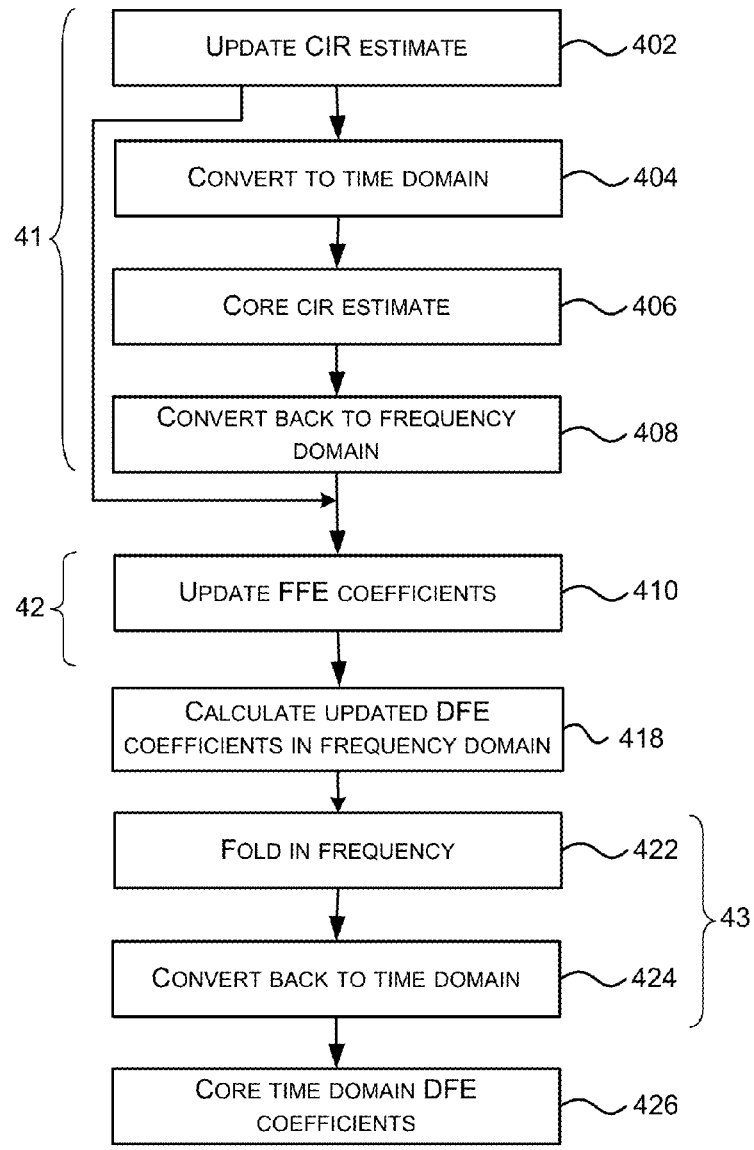
FIG. 4 shows a flow diagram of another example method of operation of a coefficient tracking module.
Figure 5:
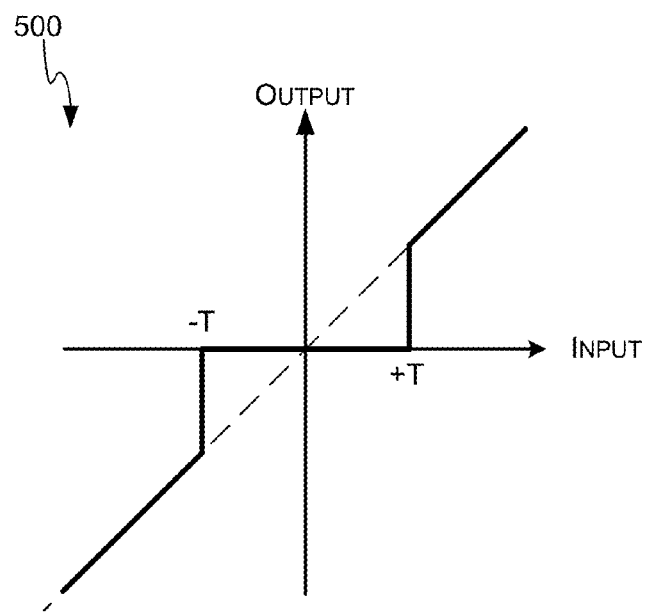
FIG. 5 is a graph showing a core operation.

FIG. 4 shows a flow diagram of another example method of operation of a coefficient tracking module such as those shown in FIGS. 1 and 3. In this example, the CIR estimate is updated (block 402) and as described above, the CIR estimate is an accumulated averaged result. This estimate (which is in the frequency domain) may then be cored (in block 406) and in order to perform the core operation, the CIR estimate is first converted into the time domain (block 404) and then subsequently converted back into the frequency domain (in block 408) following the optional core operation. The core operation is shown graphically in FIG. 5 and has the effect of reducing the small noise. As shown in the graph 500, which shows output values against input values, small values which are below a threshold, T, are set to zero and values above the threshold maintain their value. The operation is symmetric about the zero point, as shown in FIG. 5. The output of this first stage 41 (block 402 or blocks 402-408) is fCIR In a second stage 42, the FFE coefficients are updated (block 410), for example using equation (1) or (4) above.

Having generated the fCIR and fFFE in the first two stages 41, 42, the updated DFE coefficients are then generated (block 418). These are generated in the frequency domain using equation (3) above.

Following calculation of the updated DFE coefficients in the frequency domain (in block 418), these are converted to the time domain DFE coefficients, tDFE, in a further stage 43. This stage 43 comprises folding the updated DFE coefficients in the frequency domain (block 422), which corresponds to extracting the real part, and then converting the real part back to the time domain (block 424). It will be appreciated that for the purpose of the methods described herein, all the data is considered to be in baseband. Where the data is not in baseband, the data may be shifted back to baseband when implementing the methods described herein.

The method may then comprise an optional operation of coring the time domain DFE coefficients (block 426) which has the effect of cleaning up the coefficients (i.e. removing small noise) before they are used by the DFE (e.g. DFE 104 in FIG. 1).

Figure 6:
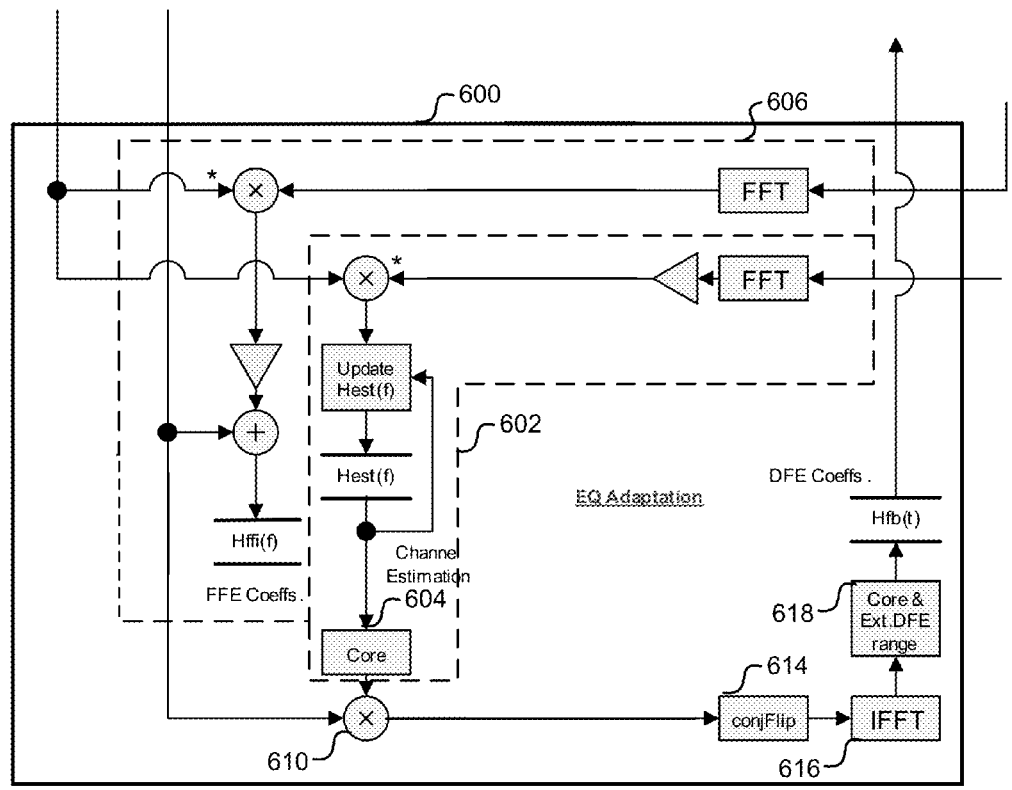
FIG. 6 shows a block diagram of a more detailed example implementation of a coefficient tracking module.

FIG. 6 shows a block diagram of a more detailed example implementation of a coefficient tracking module 600 (such as shown in FIGS. 1 and 3 and described above). The CIR estimation module is indicated by a dotted outline 602 (including an element 604 which performs the optional core operation, as in block 406 of FIG. 4), the FFE coefficient update module is indicated by a dotted outline 606. The remaining elements within the coefficient tracking module 600 are used in generating the updated DFE coefficients. The updated FFE coefficients and updated CIR estimate are combined in multiplier 610 and the result is then folded (element 614, as in block 422), converted into the time domain in the IFFT 616 and cored (element 618, as in block 426) before the resultant updated DFE coefficients (in the time domain) are output to the DFE (or more specifically to the FIR in the DFE, as shown in FIG. 1).

Although the description above refers to the generation of the updated DFE coefficients in the frequency domain, in other examples, the time domain may alternatively be used. In such an example, equation (3) would be replaced by:

$$tDFE = tCIR * tFFE \quad (5)$$

where:
  *means convolution (and not a multiplication as in equation (3));

tDFE are the updated DFE coefficients in the time domain;
  tCIR is the updated CIR estimate in the time domain; and
  tFFE are the updated FFE coefficients in the in the time domain.

Furthermore in some examples, the updated FFE coefficients may be generated using the time domain version of LMS updating. The frequency domain LMS updating is nearly equivalent to the time domain version, however, when operating in the frequency domain, the data is processed in blocks and all the equalisation coefficients remain unchanged within each individual block of data. This has the effect that during the block, all the equalisation errors are accumulated to form a time domain error tErr[k].

Although the description above refers to the updated FFE coefficients being generated using the LMS algorithm, it will be appreciated that any suitable method may be used to generate updated FFE coefficients and these updated FFE coefficients are then used, along with an updated CIR estimate, to generate updated DFE coefficients. Examples of other suitable methods include use of the recursive-least-squares (RLS) algorithm.

In a variation of the methods described above, the LMS (or similar) algorithm may be used to calculate the updated DFE coefficients (e.g. using equation (2) above) and then the updated CIR estimate and the updated DFE coefficients may be used to calculate updated FFE coefficients (e.g. using equation (3) or (5) above).

The functional elements shown in FIGS. 1, 3 and 6 and the method blocks shown in FIGS. 2 and 4 may be implemented using hardware logic and in an example may be implemented in a Digital Signal Processor.

The methods described above relate to the generation of updated equaliser coefficients. The initial coefficients may be calculated in any way and in some examples may be calculated by solving the Wiener-Hopf equation. In other examples, however, the initial coefficients may be calculated using the method shown in FIG. 7 which requires significantly less processing effort than solving the Wiener-Hopf equation.

Figure 7:
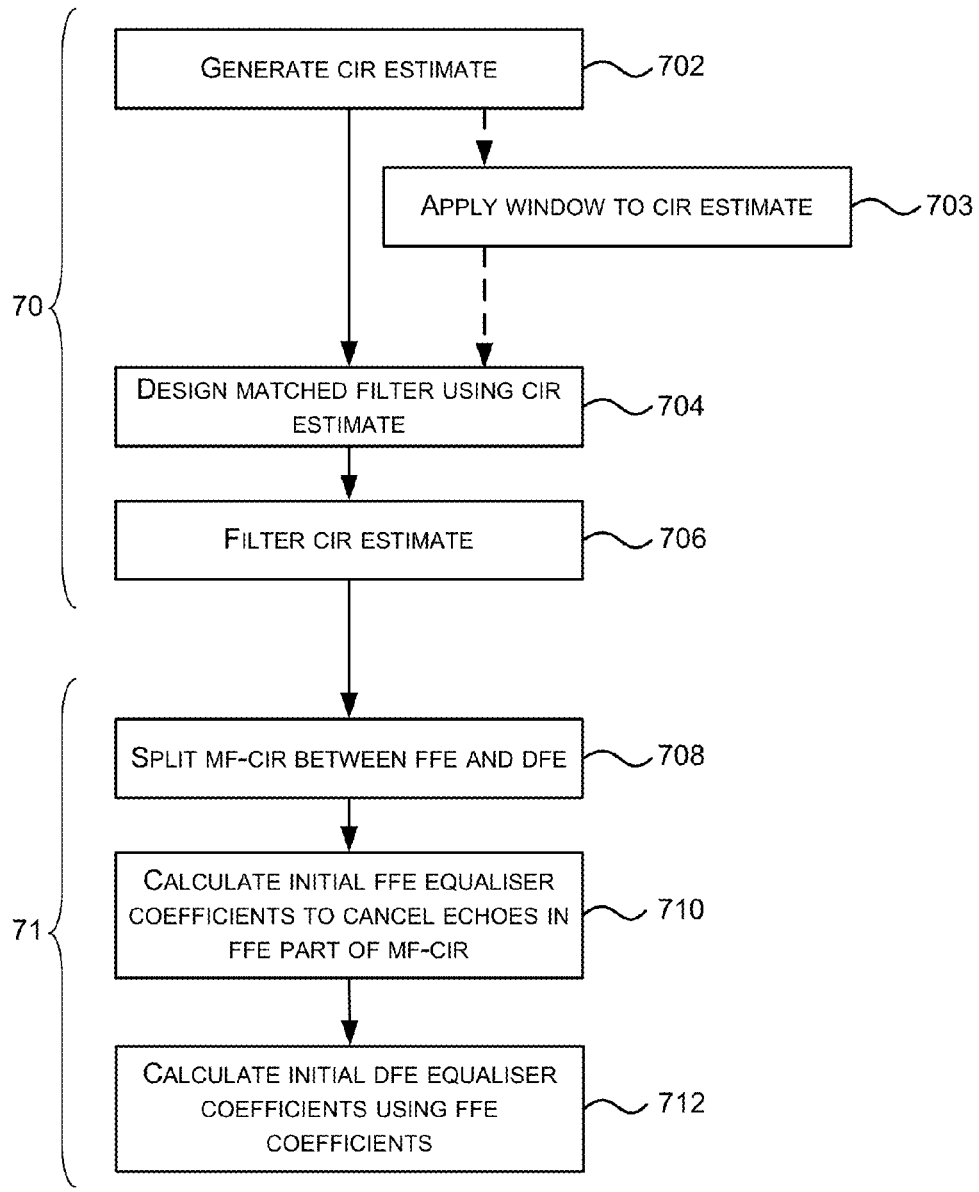
FIG. 7 is a flow diagram of an example method of calculating initial equaliser coefficients.

The method of calculating initial equaliser coefficients shown in FIG. 7, comprises two stages 70, 71: firstly a channel matched filter (which may also be referred to as a 'matched filter') is designed and applied to the initial channel estimate (which may be obtained using conventional methods). Applying the channel matched filter enhances the main path energy and removes carrier phase offset and sample timing offset. Secondly, FFE and DFE coefficients are calculated from the match filtered channel estimation generated in the first stage 70. As described in more detail below, the matched filter is designed and applied in the complex domain (which may also be referred to as the fractional spaced domain) and then after the matched filter is applied, the data is converted into the real only domain (which may also be referred to as the symbol spaced domain), which allows use of a less complex algorithm to derive FFE and DFE coefficients without losing any information within the initial channel estimation.

Figure 8:
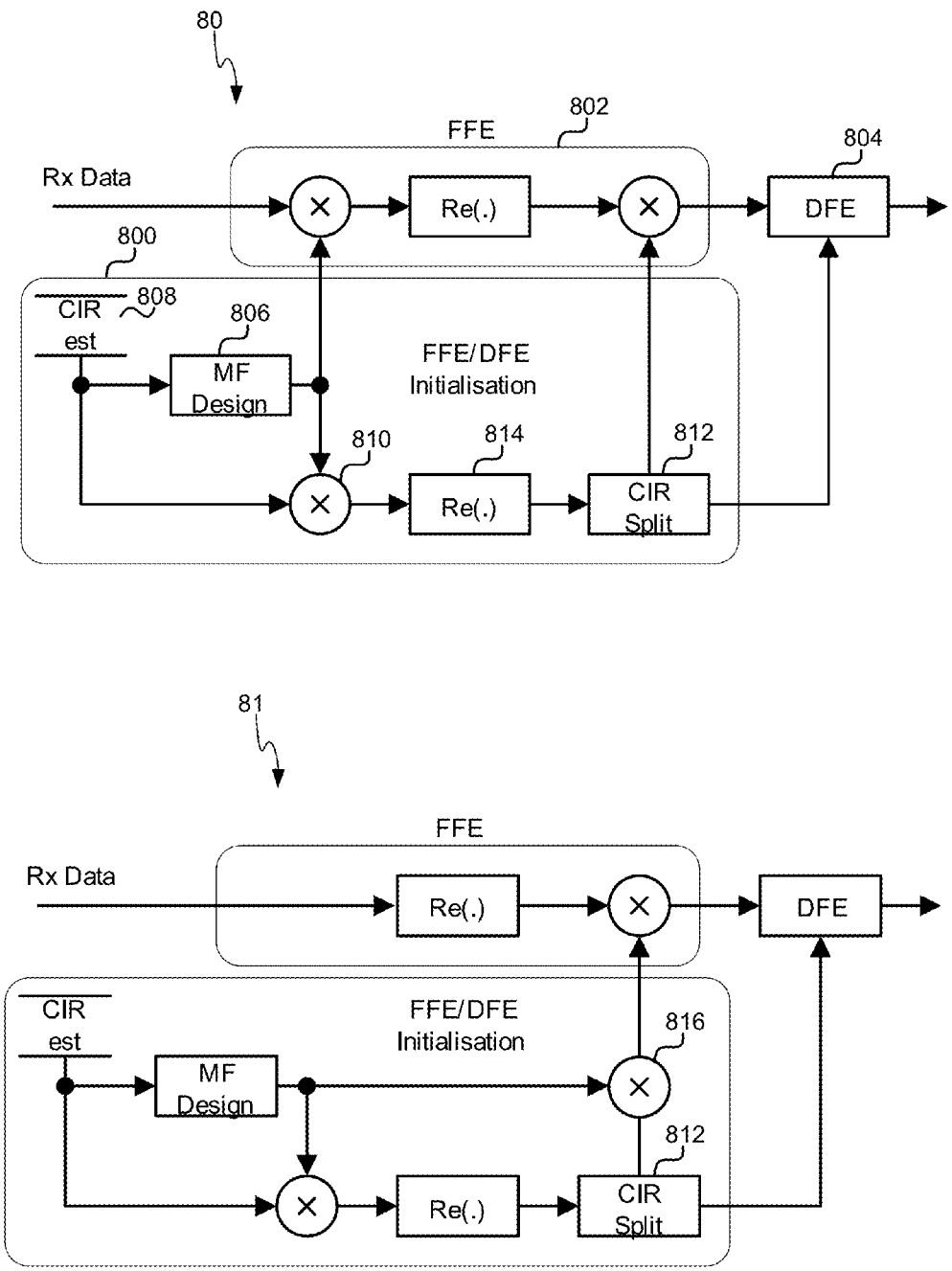
FIG. 8 shows two block diagrams of example methods of generating initial equaliser coefficients.

FIG. 8 comprises two block diagrams 80, 81, each showing an example method of generating initial equaliser coefficients and these can be described with reference to the flow diagram in FIG. 7. In the first block diagram 80, the initial equaliser coefficients are generated in the FFE/DFE initialisation block 000 and are fed into both the FFE 002 and DFE 804. As described above, in the first stage 70, an initial channel estimation or estimated channel impulse response (CIR) 808 is generated (in block 702). This initial channel estimation may be generated using any method, for example using known techniques and a pilot sequence. A matched filter (MF) is then generated using the estimated CIR 808 (blocks 704 and 806) and methods of generating the matched filter are described below. The matched filter (generated in blocks 704 and 806) is then applied to the estimated CIR 808 (in block 706, e.g. using multiplier 810) to produce the match filtered CIR.

In the second stage 71, the match filtered CIR (MF-CIR) is split into a first portion and a second portion (in blocks 708 and 812) and the first portion of the MF-CIR is used to generate initial FFE coefficients (in block 710) which are fed into the FFE 802. The first portion of the MF-CIR comprises all the pre-echoes and in some examples may additionally comprise part of the short post-echoes. The initial FFE coefficients may be generated (in block 710) by converting the first portion of the MF-CIR back to the frequency domain using a FF, inverting the signal and combining the inverted signal with input dummy FFE coefficients (which may be set to all ones). In some cases, the method may be iterated to refine the coefficients with the output FFE coefficients from one iteration being used instead of input dummy FFE coefficients in the next stage.

These initial FFE coefficients and the second portion of the MF-CIR are then used (in block 712) to generate the initial DFE coefficients which are fed into the DFE 804. The initial DFE coefficients may be generated in the frequency domain (in block 712) using equation (3) above, but where for calculation of initial DFE coefficients the variables are defined slightly differently as follows:

fDFE are the initial DFE coefficients in the frequency domain;

fCIR is the CIR estimate 808; and fFFE are the initial FFE coefficients in the frequency domain (as generated in block 710).

The inverse FFT (IFFT) is then taken of the fDFE, to convert to the time domain, and then the post echo components are extracted. As the DFE coefficients are in the time domain, extracting the post echo components can be achieved by removing the components which occur at negative and zero time and keeping only the positive time components.

The calculation of the initial FFE and DFE coefficients, as described above, is performed within the 'CIR Split' block 812.

As shown in FIG. 8, the FFE coefficient generation (in blocks 710 and 812) uses the real-part of the match filtered CIR (as extracted in block 814 from the match filtered CIR output from multiplier 810). Although the extraction of the real-part of the MF-CIR is shown as a separate functional block in FIG. 8, it may be integrated within the CIR split/FFE coefficient calculation process.

The channel matched filter may be generated (in blocks 704 and 806) in either the time or frequency domain. In the time domain, the matched filter may be generated by taking the complex conjugate of the time reversed channel impulse response (i.e. the complex conjugate of the time reversed CIR estimate 808). In the frequency domain, the matched filter may be generated (in blocks 704 and 806) by taking the complex conjugate of the channel frequency response.

The channel matched filter (generated in blocks 704 and 806) may introduce additional channel impulse responses which may fall outside the equaliser range, i.e. they would require tap lengths which exceed the maximum available (or desired) length within the equaliser. Consequently, in some examples, a window may be applied to the estimated CIR 808 (in block 703) before it is used to generate the channel matched filter (in blocks 704 and 806). Various different window shapes may be used, for example a window with a constant amplitude, a window with a leading part having a reduced amplitude, or a window with a leading part having a reduced amplitude and a trailing part having a reduced amplitude.

The second block diagram 81 in FIG. 8 shows an alternative implementation in which the matched filter (as generated in blocks 704 and 806) is applied to the output FFE coefficients in the frequency domain using multiplier 816. By applying the matched filter in this way, it removes the requirement for one of the multipliers within the FFE 802 in the first diagram 80. In the second diagram, the multiplier 816 is shown separate from the CIR split block 812; however it will be appreciated that the multiplier 816 may alternatively be implemented within the CIR split block 812.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The methods described herein may be used in equalisation of digital terrestrial television signals, for example within a digital television receiver. The methods are, however, also applicable to other applications which use a combination of FFE and DFE (e.g. as shown in FIG. 1) and the methods are not limited to use with digital television signals.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of generating updated decision-feedback equaliser (DFE) coefficients for use in an equaliser in a wireless receiver, the equaliser comprising a feed-forward equaliser (FFE) and a DFE and the method comprising:
    updating a channel impulse response estimate;
    updating FFE coefficients;
    generating updated DFE coefficients based on the updated channel impulse response estimate and the updated FFE coefficients;
    extracting a real part of the updated DFE coefficients; and
    converting the real part of the updated DFE coefficients to the time domain.

2. The method according to claim 1, wherein the FFE coefficients are updated based on a decision directed error signal.

3. The method according to claim 1, wherein generating updated DFE coefficients comprises:
    multiplying the updated channel impulse response estimate in the frequency domain and the updated FFE coefficients in the frequency domain.

4. The method according to claim 3, further comprising:
    removing small noise from the updated channel impulse response estimate prior to using the updated channel impulse response to generate the updated DFE coefficients.

5. The method according to claim 4, wherein removing small noise from the updated channel impulse response estimate comprises:
    converting the updated channel impulse response estimate to the time domain;
    coring the updated channel impulse response estimate; and
    converting the cored updated channel impulse response estimate to the frequency domain.

6. The method according to claim 1, further comprising:
    coring the time domain updated DFE coefficients.

7. A non-transitory computer readable storage medium having encoded thereon computer readable program code for generating a processor configured to perform the method of claim 1.

8. An equaliser for use in a wireless receiver, the equaliser comprising a feed-forward equaliser (FFE), a decision-feedback equaliser (DFE) and a coefficient tracking module arranged to generate updated coefficients for the FFE and DFE comprising:
    a channel impulse response (CIR) estimation module arranged to store and update an averaged estimate of CIR;
    a FFE coefficient update module arranged to generate updated FFE coefficients;
    hardware logic arranged to generate updated DFE coefficients based on the updated CIR estimate and the updated FFE coefficients;
    a frequency folding module arranged to extract a real part of the updated DFE coefficients; and
    an inverse fast Fourier transform (IFFT) module arranged to convert the real part of the updated DFE coefficients to the time domain.

9. The equaliser according to claim 8, wherein the FFE coefficient update module comprises an input for receiving a decision directed error signal and wherein the module is arranged to update the FFE coefficients based on the received decision directed error signal.

10. The equaliser according to claim 8, wherein the hardware logic arranged to generate updated DFE coefficients comprises:
    a multiplier arranged to multiply the updated channel impulse response estimate in the frequency domain and the updated FFE coefficients in the frequency domain.

11. The equaliser according to claim 8, wherein the CIR estimation module further comprises:
    a core element arranged to remove small noise from the updated CIR estimate prior to outputting the updated CIR estimate to the hardware logic arranged to generate updated DFE coefficients.

12. The equaliser according to claim 11, wherein the core element comprises:
    an inverse fast Fourier transform (IFFT) element arranged to convert the updated CIR estimate to the time domain prior to coring; and
    a fast Fourier transform (FFT) element arranged to convert the cored updated CIR estimate back to the frequency domain after coring.

13. The equaliser according to claim 8, wherein the hardware logic arranged to generate updated DFE coefficients further comprises:
    a core module arranged to receive the time domain updated DFE coefficients from the IFFT module and output the cored updated DFE coefficients to the DFE.

14. A non-transitory computer readable storage medium having encoded thereon computer readable program code for generating a processor comprising the equaliser of claim 8.

15. A digital television receiver comprising an equaliser for use in a wireless receiver, the equaliser comprising a feed-forward equaliser (FFE), a decision-feedback equaliser (DFE) and a coefficient tracking module arranged to generate updated coefficients for the FFE and DFE comprising:

a channel impulse response (CIR) estimation module arranged to store and update an averaged estimate of CIR;

a FFE coefficient update module arranged to generate updated FFE coefficients;

hardware logic arranged to generate updated DFE coefficients based on the updated CIR estimate and the updated FFE coefficients;

a frequency folding module arranged to extract a real part of the updated DFE coefficients; and an inverse fast Fourier transform (IFFT) module arranged to convert the real part of the updated DFE coefficients to the time domain.

\* \* \* \* \*